United States Patent
Worden et al.

(10) Patent No.: US 10,749,159 B2
(45) Date of Patent: *Aug. 18, 2020

(54) SENSOR SYSTEM

(71) Applicant: General Electric Company, Schenectady, NY (US)

(72) Inventors: Bret Worden, Erie, PA (US); Jingjun Zhang, Lawrence Park, PA (US); David Petersen, Erie, PA (US)

(73) Assignee: GE GLOBAL SOURCING LLC, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/165,716

(22) Filed: Oct. 19, 2018

(65) Prior Publication Data

US 2019/0081303 A1 Mar. 14, 2019

Related U.S. Application Data

(63) Continuation of application No. 15/362,866, filed on Nov. 29, 2016, now Pat. No. 10,167,004.

(Continued)

(51) Int. Cl.
*H01M 2/16* (2006.01)
*H04Q 9/00* (2006.01)
(Continued)

(52) U.S. Cl.
CPC .......... *H01M 2/1653* (2013.01); *B32B 27/08* (2013.01); *B60L 15/20* (2013.01); *B61L 3/008* (2013.01);
(Continued)

(58) Field of Classification Search
CPC ............. H01M 2/1653; H01M 2/1686; H01M 10/052; H01M 2/18; C08J 5/18;
(Continued)

(56) References Cited

U.S. PATENT DOCUMENTS

2007/0052519 A1    3/2007  Talty et al.
2007/0149184 A1*   6/2007  Viegers ............... G08B 25/016
                                                    455/422.1
(Continued)

FOREIGN PATENT DOCUMENTS

CN    102616249 A    8/2012
CN    103968893 A    8/2014
WO      9412917 A1   6/1994

OTHER PUBLICATIONS

Notice of Acceptance issued in connection with corresponding AU Application No. 2016273955 dated Jul. 26, 2018.

(Continued)

*Primary Examiner* — Rodney A Butler
(74) *Attorney, Agent, or Firm* — The Small Patent Law Group LLC; Josef L. Hoffmann (57) ABSTRACT

A sensor system senses one or more characteristics of vehicles in a vehicle system with sensors disposed onboard the vehicles and communicate data representative of the one or more characteristics from the sensors to one or more of a controller or a control system of the vehicle system. The data communicated from the sensors onboard the same vehicle can be synchronously communicated with respect to the sensors onboard the same vehicle and asynchronously communicated with respect to the sensors disposed onboard one or more other vehicles in the vehicle system. The systems and methods can direct components disposed onboard a vehicle system to change operations, monitor data output by sensors operatively connected with the components, and determine which of the sensors are operatively connected with which of the components based on the operations of the components that are changed and the data that is output by the sensors.

20 Claims, 5 Drawing Sheets

Related U.S. Application Data (60) Provisional application No. 62/269,163, filed on Dec. 18, 2015.

(51) Int. Cl.
  | | |
  |---|---|
  | *B60L 15/20* | (2006.01) |
  | *B61L 3/00* | (2006.01) |
  | *B61L 3/16* | (2006.01) |
  | *B61L 15/00* | (2006.01) |
  | *B32B 27/08* | (2006.01) |
  | *C08J 5/18* | (2006.01) |
  | *H01M 2/18* | (2006.01) |
  | *H01M 10/052* | (2010.01) |

(52) U.S. Cl.
  CPC .............. *B61L 3/16* (2013.01); *B61L 15/0072* (2013.01); *C08J 5/18* (2013.01); *H01M 2/1686* (2013.01); *H04Q 9/00* (2013.01); *B60L 2200/26* (2013.01); *B60L 2240/423* (2013.01); *C08J 2323/06* (2013.01); *C08J 2491/06* (2013.01); *H01M 2/18* (2013.01); *H01M 10/052* (2013.01); *H04Q 2209/25* (2013.01); *H04Q 2209/40* (2013.01); *H04Q 2209/82* (2013.01); *H04Q 2209/826* (2013.01); *Y02T 10/7258* (2013.01)

(58) Field of Classification Search
  CPC ... C08J 2491/06; C08J 2323/06; B32B 27/08; B61L 15/0072; B61L 3/16; B61L 3/008; B61L 15/20; H04Q 9/00; H04Q 2209/826; H04Q 2209/82; H04Q 2209/25; H04Q 2209/40; B60L 2240/423; B60L 2200/26; Y02T 10/7258; G01D 21/02

See application file for complete search history.

(56) References Cited

U.S. PATENT DOCUMENTS

| | | |
  |---|---|---|
  | 2013/0267194 A1 | 10/2013 | Breed |
  | 2013/0342362 A1 | 12/2013 | Martin |
  | 2017/0337111 A1* | 11/2017 | Kalisch .................. G06F 11/27 |

OTHER PUBLICATIONS

First Office Action and Search issued in connection with corresponding CN Application No. 201611166621.2 dated Nov. 22, 2018 (English Translation not available).

* cited by examiner

SENSOR SYSTEM

CROSS-REFERENCE TO RELATED APPLICATIONS

This application is a continuation of U.S. patent application Ser. No. 15/362,866, filed 29 Nov. 2016, which claims priority to U.S. Provisional Patent Application No. 62/269,163, filed 18 Dec. 2015, the entire disclosures of which are incorporated herein by reference. This application also is related to U.S. patent application Ser. No. 14/421,245 (filed 12 Feb. 2015), Ser. No. 14/866,320 (filed 25 Sep. 2015), and Ser. No. 14/869,038 (filed 29 Sep. 2015), the entire disclosures of which are incorporated herein by reference.

FIELD

The subject matter described herein relates to systems of sensors, and communication of information sensed by the sensors to one or more locations.

BACKGROUND

Various systems can include sensors for monitoring characteristics of the systems and/or surroundings of the systems. For example, vehicle systems, stationary power systems, etc., can include several sensors monitoring the same or different characteristics. These sensors can monitor vibrations, temperatures, states, or the like, of the systems in order to track operation of the systems, identify unsafe conditions, determine when maintenance or repair of the systems are needed, or to achieve other objectives.

Some sensors may wirelessly communicate the characteristics monitored by the sensors. With several sensors in a system being monitored, there is an increased risk of interference between the wireless signals being communicated by the sensors. For example, the radio frequency (RF) signals of some sensors may interfere with the RF signals of other sensors. This interference can prevent some signals from being received by a controller or other device that receives the sensed characteristics of the system, can distort the data included in some signals, or the like.

The interference can prevent the controller or other device from accurately monitoring the characteristics being sensed by the sensors. As a result, the controller or other device may be unable to track operation of the system, identify unsafe conditions, determine when maintenance or repair of the system is needed, or achieve other objectives using at least some of the characteristics being monitored by the sensors.

Additionally, a controller or other device that is tracking the characteristics monitored by several sensors may need to be provided with identities and/or locations of the various sensors. For example, a controller onboard a vehicle may need to be provided with locations of where different sensors are located in order to determine where the characteristics are being monitored by the sensors. Some systems require that the locations and/or identities of the sensors be manually input into the controller or other device that receives the sensor data. This can add significant time and cost to establishing the system for operation. Other systems may require the sensors to communicate the identities of the sensors, which adds to the complexity and cost of the sensors.

BRIEF DESCRIPTION

In one embodiment, a method includes sensing one or more characteristics of vehicles in a vehicle system with sensors disposed onboard the vehicles and communicating data representative of the one or more characteristics from the sensors to one or more of a controller or a control system of the vehicle system. The data communicated from the sensors onboard the same vehicle can be synchronously communicated with respect to the sensors onboard the same vehicle and asynchronously communicated with respect to the sensors disposed onboard one or more other vehicles in the vehicle system.

In one embodiment, a system includes sensors configured to be disposed onboard vehicles in a vehicle system and to sense one or more characteristics of the vehicles and one or more of a controller or a control system configured to receive data representative of the one or more characteristics from the sensors. The data communicated from the sensors onboard the same vehicle is synchronously communicated with respect to the sensors onboard the same vehicle and asynchronously communicated with respect to the sensors disposed onboard one or more other vehicles in the vehicle system.

In one embodiment, a method directing components disposed onboard a vehicle system to change operations, monitoring data output by sensors operatively connected with the components, and determining which of the sensors are operatively connected with which of the components based on the operations of the components that are changed and the data that is output by the sensors.

In one embodiment, a system includes a control system configured to direct components disposed onboard a vehicle system to change operations, the control system also configured to monitor data output by sensors operatively connected with the components. The control system is configured to determine which of the sensors are operatively connected with which of the components based on the operations of the components that are changed and the data that is output by the sensors.

BRIEF DESCRIPTION OF THE DRAWINGS

The inventive subject matter described herein will be better understood from reading the following description of non-limiting embodiments, with reference to the attached drawings, wherein below.

DETAILED DESCRIPTION

Reference will be made below in detail to example embodiments of the inventive subject matter, examples of which are illustrated in the accompanying drawings. Wherever possible, the same reference numerals used throughout the drawings refer to the same or like parts. Although embodiments of the inventive subject matter are described with respect to vehicle systems such as trains, locomotives, and other rail vehicles, embodiments of the inventive subject matter are also applicable for use with vehicles generally, such as off-highway vehicles (e.g., vehicles that are not designed or permitted to travel on public roadways), agricultural vehicles, and/or transportation vehicles, each of which may include a vehicle consist. A vehicle system may be formed from two or more vehicles that communicate with each other to coordinate travel of the vehicle system, but that are not mechanically linked with each other. For example, a vehicle system may include two or more vehicles that wirelessly communicate with each other so that the different vehicles may change the respective speeds, tractive efforts, braking efforts, and the like, to cause the separate vehicles to travel together as a convoy or other group along the same route. Optionally, one or more embodiments of the systems and methods described herein may be used with other non-vehicular systems, such as stationary powered systems.

Figure 1:
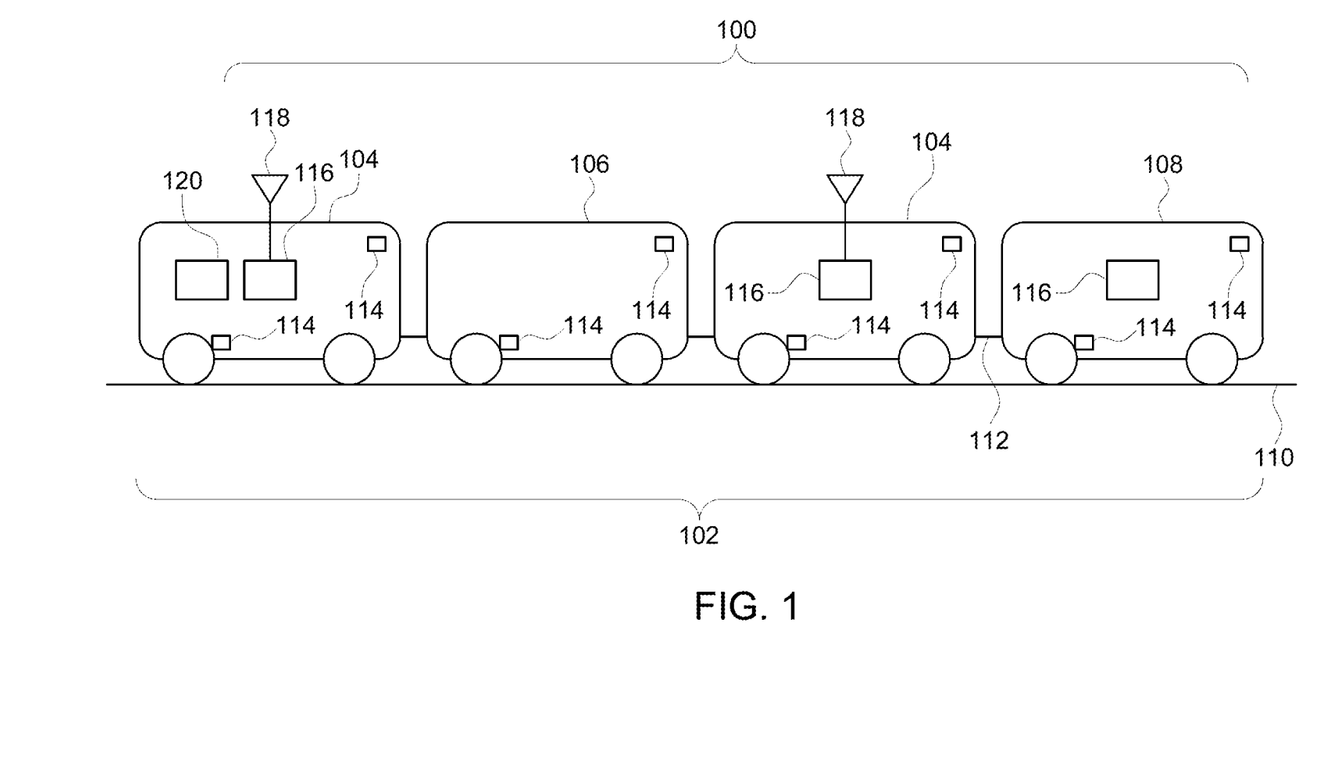
FIG. 1 illustrates a sensor system of a vehicle system according to one embodiment.

FIG. 1 illustrates a sensor system 100 of a vehicle system 102 according to one embodiment. The vehicle system 102 includes a group of vehicles 104, 106, 108 that travel together along a route 110. One or more of the vehicles can represent propulsion-generating vehicles, such as locomotives, automobiles, marine vessels, or the like. Optionally, one or more of the vehicles can represent non-propulsion-generating vehicles, such as rail cars, trailers, barges, or the like. The route can represent a road, track, waterway, etc. The number and arrangement of the vehicles are provided as one example that is not limiting on all embodiments described herein. The vehicles may be mechanically connected with each other by one or more couplers 112. Alternatively, the vehicles may not be mechanically connected with each other, but may communicate with each other to coordinate movement of the vehicles so that the vehicles travel together along the route as the vehicle system.

The sensor system includes several sensors 114. The sensors may be disposed onboard several vehicles, such that the sensors are distributed among the vehicles in the vehicle system or may be disposed onboard a single vehicle. The sensors can represent a variety of devices that monitor characteristics of the vehicle system and/or the environment around the vehicle system. For example, the sensors may include temperature sensors (e.g., sensors that output data representative of temperatures of the vehicles and/or environment, such as hot box detectors, infrared cameras, etc.), vibration sensors (e.g., sensors that output data representative of movement in one or more directions, such as accelerometers), pressure sensors (e.g., sensors that output data representative of fluid pressure, such as air pressure in tires of the vehicles, pressures of oil or other lubricants in gear boxes and/or engines, etc.), fluid sensors (e.g., sensors that output data representative of an oil or other fluid level, or how much oil or other lubricant is in gear boxes, engines, etc.), location sensors (e.g., sensors that output data representative of geographic or other locations, such as a global positioning system receiver), speed sensors (e.g., sensors that output data representative of how rapidly a vehicle is moving, how rapidly a wheel and/or axle is rotating, etc.), acoustic sensors (e.g., sensors that output data representative of sounds, such as microphones), optic sensors (e.g., sensors that output data representative of images and/or videos, such as cameras, infrared detectors), electromagnetic sensors (e.g., sensors that obtain and/or output data using electromagnetic waves, such as radio frequency identification interrogators or tags), etc.

The sensors and/or system can include transceiving circuitry, such as antennas, wires, modems, routers, network hubs, or the like, that communicate data between and/or among the sensors and one or more controllers 116 of the sensor system. The controllers of the sensor system can be disposed on one or more of the vehicles in the vehicle system but may not be disposed onboard all vehicles in the vehicle system. Alternatively, a controller may be disposed onboard all vehicles in the vehicle system. The controllers receive data that is output from the sensors. The sensors may wirelessly communicate the data to the controllers (e.g., using antennas and other transceiving circuitry that are included in or connected with the sensors), and/or may communicate data to one or more of the controllers, which then communicate the sensor data to one or more other locations using antennas and transceiving circuitry 118 connected with or included in the controllers. The controllers optionally may be referred to as gateways as the controllers provide access, entry, or paths for the sensor data to be communicated to and/or from the sensors.

The controllers and/or sensors may communicate the data to a control system 120 of the vehicle system. The control system can issue signals to various devices of the vehicle system to control operations of the vehicle system, such as signals that direct motors to rotate wheels of the vehicle system, direct brakes of the vehicle system to actuate, etc. The control system may generate the signals based on input received from an operator of the vehicle system, from data received from the sensors, or the like. The controllers and/or the control system may represent or include hardware circuitry that includes and/or is connected with one or more processors (e.g., microprocessors, field programmable gate arrays, integrated circuits, or other electronic logic-based devices) that perform various operations described herein.

Figure 2:
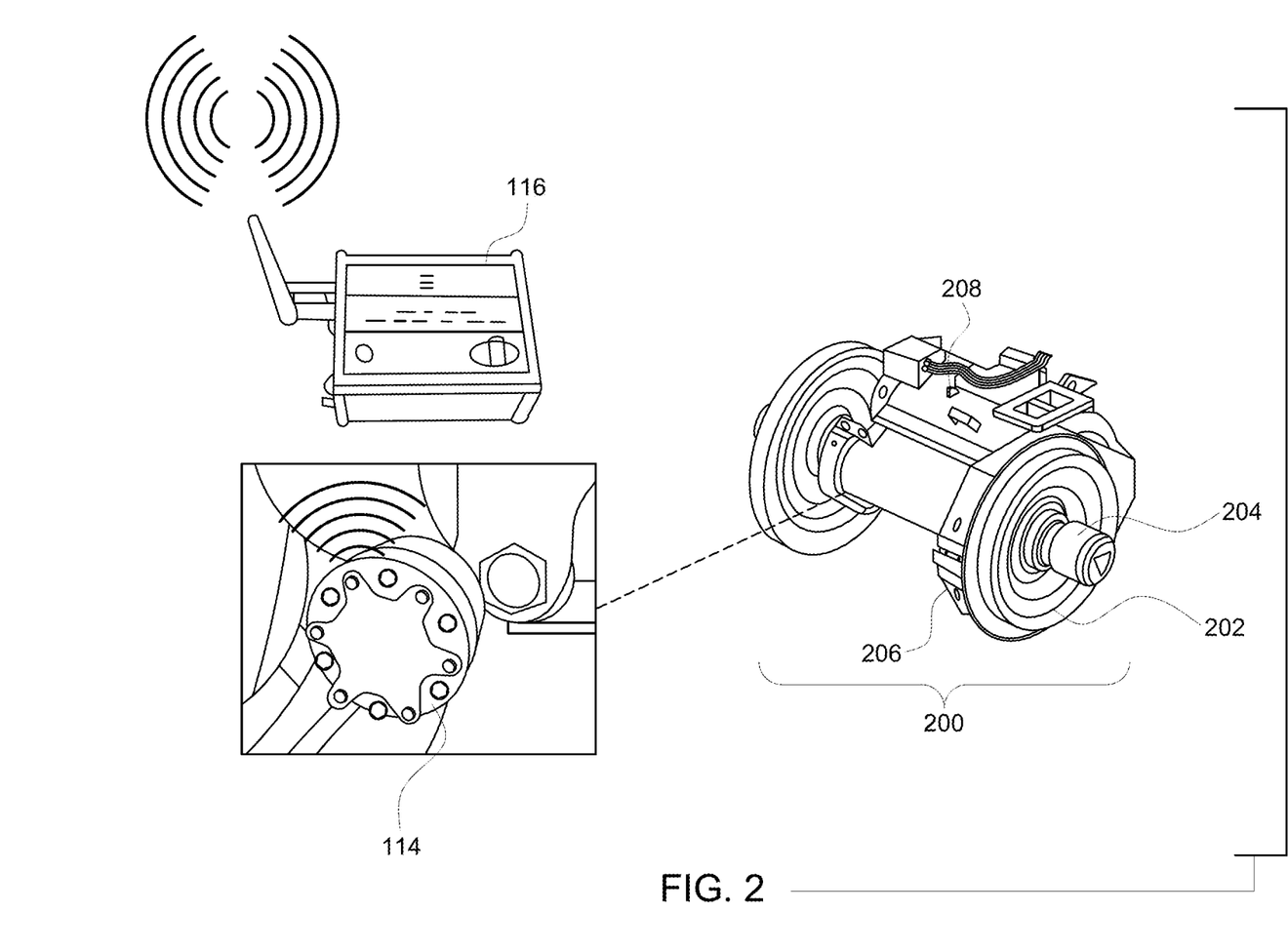
FIG. 2 illustrates one example of a sensor monitoring characteristics of the vehicle system shown in FIG. 1 and communicating data to a controller.

FIG. 2 illustrates one example of a sensor monitoring characteristics of the vehicle system shown in FIG. 1 and communicating data to a controller. The sensor 114 shown in FIG. 2 may be an oil level sensor that is connected with a wheel/axle combination 200 ("Combo" in FIG. 2) of the vehicle system 102 shown in FIG. 1. The wheel/axle combination includes wheels 202 connected with an axle 204, which is connected with a traction motor 208 by one or more gears inside a gear box 206. The gear box 206 includes lubricant, such as oil, and the sensor measures the level or amount of the lubricant in the gear box, and optionally may monitor the health, condition, or the like. In one embodiment, the sensor shown in FIG. 2 may be one or more of the sensors described in one or more of U.S. patent application Ser. No. 14/421,245; 14/866,320; or 14/869,038. Alternatively, the sensor shown in FIG. 2 may be another type of sensor. The sensor wirelessly communicates data representative of the characteristics being monitored by the sensor (e.g., capacitance of the lubricant, an amount of the lubricant, vibrations, etc.) to the controller 116. The controller may communicate this data to the control system and/or may implement one or more responsive actions, such as notifying an operator of the data output by the sensor.

Several sensors in the vehicle system may wirelessly communicate data to the controllers and/or control system. The sensors may rely on batteries or other limited energy resources for the power to measure, process, store, and/or communicate the data that is accumulated by the sensors. This energy store can be utilized with a strategy that includes a low duty cycle for the sensor that is characterized by a dominant "sleep" mode for the processors and other electronic components in the sensors. For example, a sensor may "wake up" (e.g., turn on or activate from a state where little to no electric energy is consumed by the sensor to a state where increased electric energy is consumed to perform one or more functions of the sensor) on a predefined or designated schedule (e.g., every hour or other frequency) to record information (e.g., oil level, temperature, vibration levels, etc.). The rate or frequency at which each sensor measures, detects, or otherwise senses one or more characteristics can be referred to as a sampling frequency of the sensor. The sensors may communicate data representative of the sensed characteristics to the controllers and/or control system at a rate or frequency (e.g., the number of times that the communication occurs per unit time) that may be referred to as a communication rate.

In one embodiment, the sensor system may coordinate the sampling frequencies and/or communication rates of the sensors in the vehicle system to reduce interference between communications from different sensors and/or to extend the life of the power sources (e.g., batteries) of the sensors (relative to another sampling frequency and/or communication rate). The sensor system may use a sampling strategy that is synchronous or near synchronous within the same vehicle but provides for asynchronous communication from vehicle to vehicle. This can cause the sensor communication times to be diverse between different vehicles to avoid or decrease wireless communication traffic and interference.

For example, the sensors in the sensor system may be programmed to communicate data to the controllers and/or control system at times that are dependent upon which vehicle the sensors are located on or coupled with. The sensors onboard a first vehicle in the vehicle system may communicate data to the controllers and/or control system at a first time or set of times (such as at five minutes past the beginning of every hour), the sensors onboard a different, second vehicle in the same vehicle system may communicate data to the controllers and/or control system at a different, second time or set of times (such as at ten minutes past the beginning of every hour), etc. Dividing up the communication times between the sensors based on which vehicle the sensors are on can reduce the amount of wireless communications occurring at the same time, which can reduce wireless signal interference. The sensors onboard the same vehicle may still communicate data at the same time or during the same time period to ensure that the controller and/or control system that is controlling operations of the vehicle is provided with the sensor data needed or used to control the operations of the vehicle in a timely manner.

The sensor system may coordinate the sampling frequencies and/or communication rates of the sensors in the vehicle system such that the synchronous communication within the same vehicle and the asynchronous communication between or among vehicles occurs based on the direction of the control system and/or controllers and does not merely occur by coincidence or happenstance. For example, in one mode of operation of the sensor system, the sensors may communicate the sensor data at various times (e.g., random times, pseudo-random times, at times requested by operators, etc.) that may or may not result in the sensor data communicated synchronously and/or asynchronously, as described herein. The controllers and/or control system may switch the mode of operation of the sensor system to only allow the sensors onboard the same vehicle to communicate synchronously and to only allow the sensors onboard different vehicles to communication asynchronously. This can involve preventing the sensors onboard different vehicles from synchronously communicating the data and preventing the sensors onboard the same vehicle from asynchronously communicating the data, even if the sensors would or could otherwise communicate in this manner.

In one embodiment, the sensors are programmed with a configurable wakeup interval that defines how often the sensors activate and measure or sense characteristics. This wakeup interval can be once per hour or another rate. The wakeup intervals may be diverse (e.g., different) for different vehicles in the same vehicle system to reduce wireless interference. The wakeup times for a vehicle may be based on a characteristic of the vehicle that is different from one or more, or all, other vehicles. For example, the wakeup times may be based on the road number, vehicle identification number, serial number, or other identity of the vehicle. The wakeup times can be a number of minutes past the beginning of the hour that is taken from one or more units of the identity of the vehicle or may be otherwise determined based on the vehicle identity. For example, the wakeup times for sensors onboard a vehicle may be a product of the last digit of the identity of the vehicle and 10% of the interval time (e.g., one hour) after the beginning of the hour. If a vehicle has a last digit of five and the interval time is one hour (e.g., sixty minutes), then the wakeup times of the sensors onboard that vehicle may be the product of five and ten percent of sixty minutes, or thirty. Therefore, the sensors onboard that vehicle may activate, measure characteristics, and communicate data every thirty minutes past the beginning of the hour. The wakeup times and intervals for sensors onboard the same vehicle may be the same so that the measured characteristics may be synchronized. In addition to vehicles within a vehicle system, the wakeup times also can be used for different types of vehicle systems, such as vehicles sitting near or next to each other (e.g., locomotives or trains sitting next to each other in a rail yard).

The sensors in the sensor system may need to be paired with one or more other components of the vehicle system. The sensors may be paired (e.g., associated with) with a vehicle (e.g., the vehicle on which the sensors are disposed), a controller (e.g., on the same vehicle as the sensors), and/or the control system of the vehicle system. While the description herein focuses on pairing sensors with the controllers (also referred to as gateways), the described embodiments may be used to pair the sensors with vehicles, control systems, etc.

The pairing of a sensor to a controller can provide the controller with the functional location of the sensor to allow for useful, actionable prognostic information to be provided from the sensor to the controller. The functional location of a sensor may be the location from which the data provided by the sensor represents characteristics of the vehicle, vehicle system, or environment. For example, a sensor that measures vibrations of a wheel may have a functional location that is the same as the wheel (even if the sensor is disposed elsewhere, such as on the wheel/axle combination but not directly on the wheel).

The pairing can be performed by manually inputting the locations (e.g., actual positions on the vehicles and/or functional locations) of the sensors into the controllers and/or control system, such as by entering the location along with the serial number (or other identifying information) for each sensor. But, for sensor systems having a large number of sensors, this process can be time-consuming. In one embodiment of the inventive subject matter described herein, the sensors can be automatically paired with the controllers and/or control system. The automatic pairing can occur without an operator inputting locations or identities of the sensors into the controllers and/or control system, and/or may occur without the sensors communicating identifying information or the locations of the sensors to the controllers and/or control system.

One or more of the controllers and/or the control system may change operation of one or more components of the vehicle system. One or more sensors functionally located at the one or more components having the changed operation may output data to the controllers and/or control system. This data can be used to identify which sensor or sensors are functionally located at the one or more components. The controllers and/or control system can determine which components are to have the changed operation based on the wakeup intervals or times of the different sensors.

Figure 3:
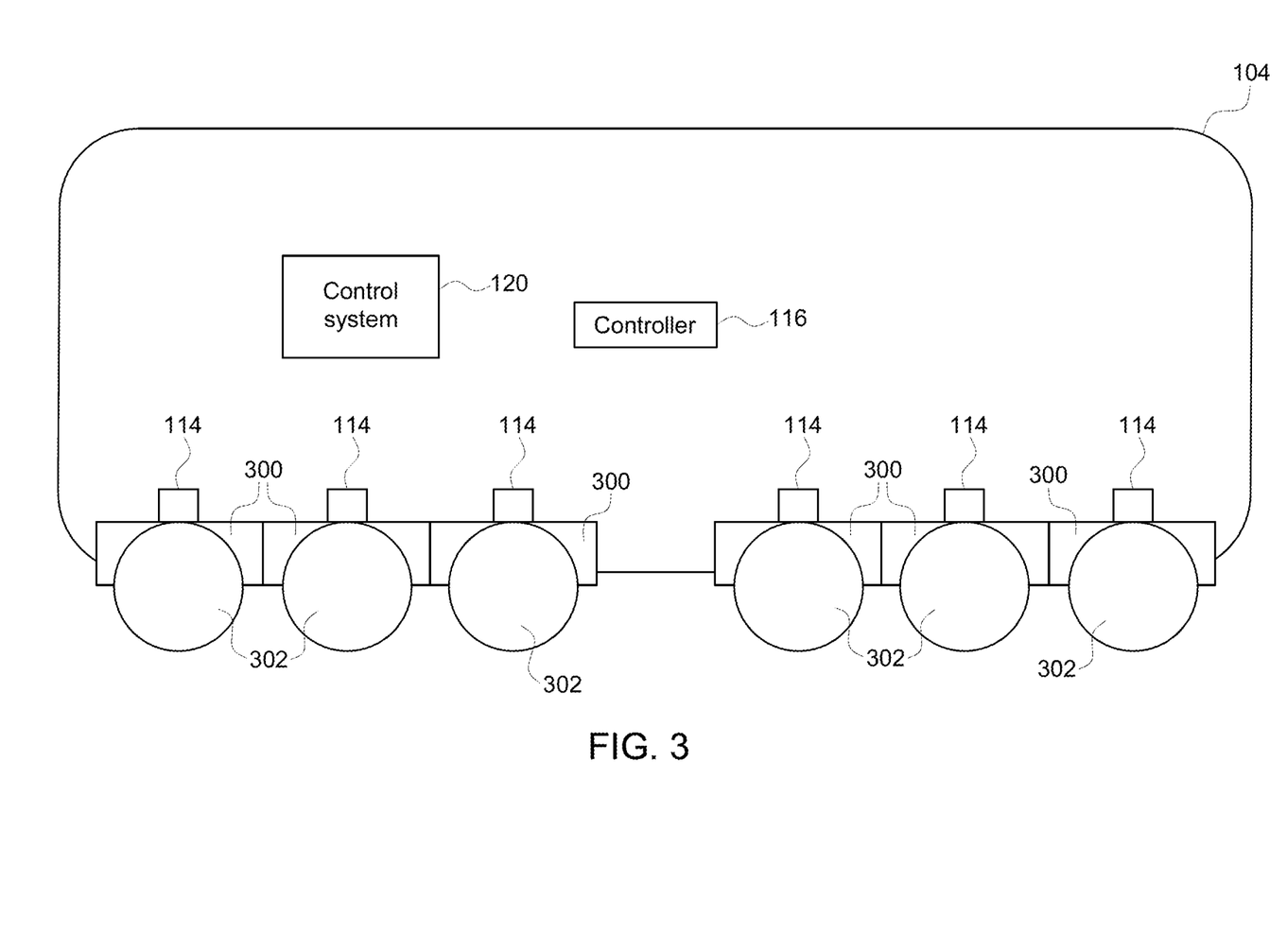
FIG. 3 illustrates one vehicle of the vehicle system shown in FIG. 1 according to one example.

FIG. 3 illustrates one vehicle 104 of the vehicle system 102 shown in FIG. 1 according to one example. While the vehicle 104 is shown in FIG. 1, alternatively, another vehicle in the vehicle system may be used. The vehicle 104 includes the control system 120, the controller 116, and several sensors 114 operably coupled with (e.g., disposed in a location where the sensors can monitor characteristics of) components 300 of the vehicle. In the illustrated embodiment, the components 300 can represent traction motors, wheel/axle combinations, or other components that operate to rotate wheels 302 of the vehicle. The sensors are described as being vibration sensors (e.g., accelerometers), but optionally may be one or more other types of sensors.

The wakeup times or intervals of the sensors onboard the vehicle may be provided to the controller, such as from an operator, from the identity of the vehicle (as described above), by being communicated from the sensors, or otherwise. The control system may direct the torques generated by the traction motors to rotate the axles and wheels of the vehicle. In the illustrated embodiment, each axle and wheel combination is connected with a different traction motor. Consequently, the control system may individually control the torques generated by the different motors directing the different motors to generate different torques at the same time. The control system can direct the torques generated by the traction motors by changing frequencies of electric current supplied to the traction motors.

Because the times at which the sensors measure the characteristics of the vehicle may be known to the control system, the control system can prepare for the sensor wakeups by applying unique motor torque profiles to the axles connected with the motors. The control system may direct one or more of the traction motors to apply a low frequency torque oscillation to each axle before, during, and/or after the times at which the sensors measure characteristics (e.g., vibrations) of the wheels and/or traction motors, and/or components connected to the wheels and/or motors. The low frequency torque oscillation may be different for different wheel/axle combinations. For example, the control system may direct the traction motors to apply an additional 100 ft lbs of torque (in addition to the torques already being generated by the traction motors) at different frequencies. The amount of torque that is added may be small relative to the torque already being applied by the traction motors (e.g., the additional torque may be no greater than 10%, 5%, 3%, 1%, or the like, of the currently generated torque) so that the total torque and/or speed of the vehicle is not significantly impacted. A first traction motor can apply the additional torque at a first frequency (e.g., at 1 Hz or another frequency), a second traction motor can apply the additional torque at a different, second frequency (e.g., at 2 Hz or another frequency), a third traction motor can apply the additional torque at a different, third frequency (e.g., at 4 Hz or another frequency), a fourth traction motor can apply the additional torque at a different, fourth frequency (e.g., at 8 Hz or another frequency), a fifth traction motor can apply the additional torque at a different, fifth frequency (e.g., at 16 Hz or another frequency), and a sixth traction motor can apply the additional torque at a different, sixth frequency (e.g., at 32 Hz or another frequency).

The sensors measure and communicate the vibrations of the wheel, axle, and/or traction motor. These vibrations may include the additional torque applied at the different frequencies. For example, increased vibrations may be detected at the first frequency by a first sensor that is functionally located at the first traction motor, increased vibrations may be detected at the second frequency by a second sensor that is functionally located at the second traction motor, and so on. The additional torque may appear as a peak, spike, or other increase in the vibrations measured by the sensors at the corresponding frequencies. Because the sensors are functionally located at different traction motors, the increased vibrations detected by one sensor at a frequency designated or selected by the control system will not be detected by the other sensors. As a result, the control system can determine where each sensor is functionally located based on the data communicated from the sensor.

Figure 4:
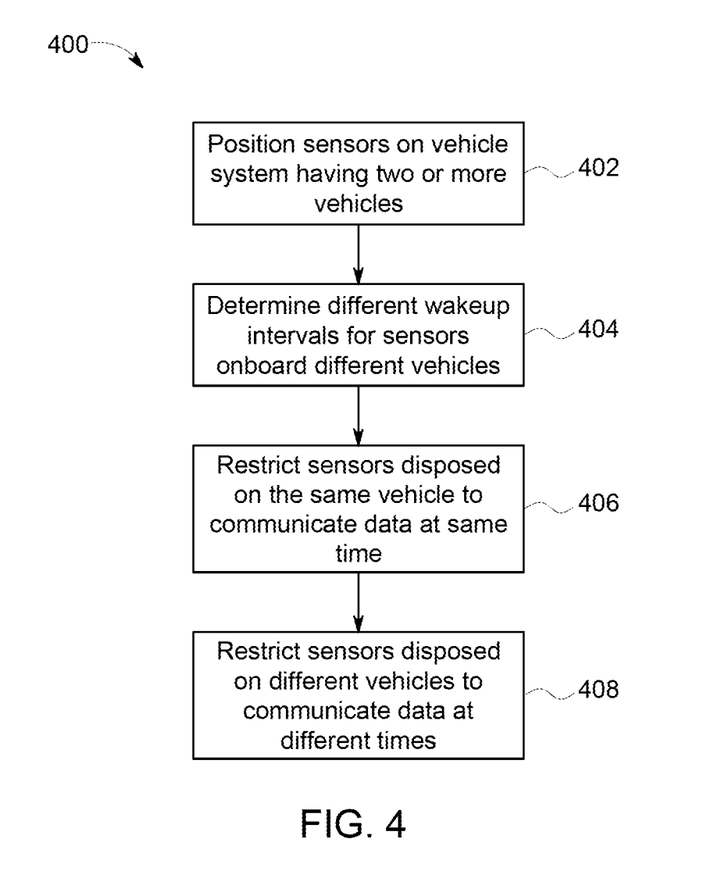
FIG. 4 illustrates a flowchart of one embodiment of a method for establishing communication intervals for sensors in a sensing system.

FIG. 4 illustrates a flowchart of one embodiment of a method 400 for establishing communication intervals for sensors in a sensing system. The method 400 may be used to establish times at which sensors on a system, such as the vehicle system shown in FIG. 1, communicate data to reduce or eliminate interference between the sensors. At 402, sensors are positioned on a system, such as a vehicle system. In one embodiment, the sensors may be positioned on different vehicles of the vehicle system. At 404, different wakeup intervals are determined for the sensors onboard the different vehicles. For example, the sensors disposed onboard the same vehicle may be programmed or otherwise directed to activate, sense characteristics of the vehicle and/or environment, and communicate data representative of the sensed characteristics at the same time that periodically repeats. But, sensors disposed onboard other vehicles may be programmed or directed with different wakeup intervals. As a result, the sensors onboard the same vehicle synchronously communicate data with respect to each other, but asynchronously communicate data with respect to the sensors onboard other vehicles.

At 406, the sensors onboard the same vehicle are restricted to communicating data at the same time. For example, the sensors onboard the same vehicle may be programmed or directed to periodically communicate sensed data at a time or during a time period that is the same for the sensors onboard the same vehicle. At 408, the sensors disposed onboard different vehicles may be restricted to communicate data at different times. For example, the sensors onboard one vehicle are programmed or directed to communicate sensed data at a time or during a time period that is different from the time or time period of the sensors onboard other vehicles. This can prevent the sensors onboard different vehicles from communicating data at the same time.

Figure 5:
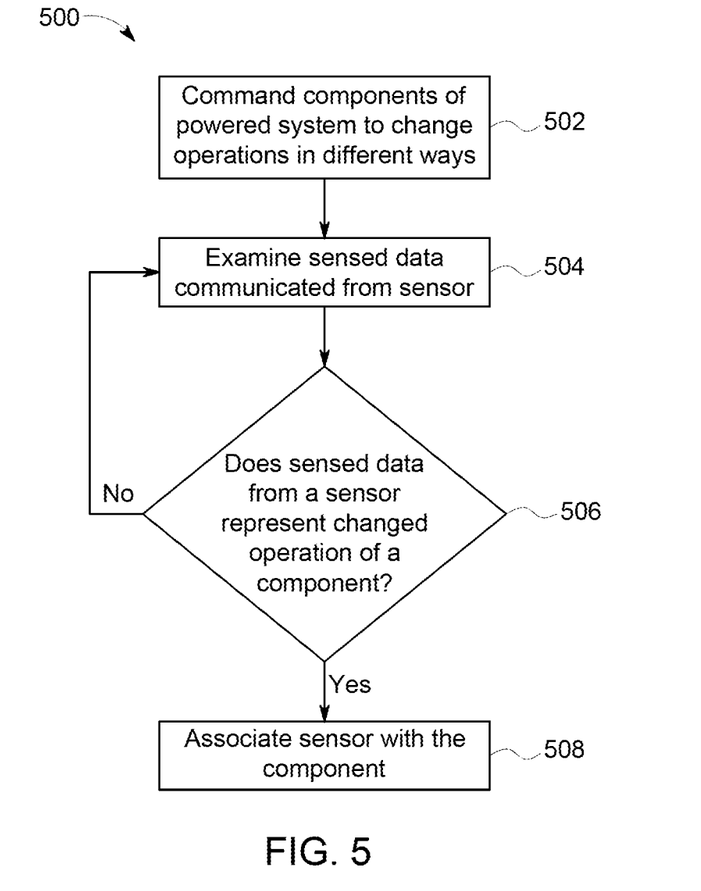
FIG. 5 illustrates a flowchart of one embodiment of a method for pairing sensors with components of a powered system, such as a vehicle system.

FIG. 5 illustrates a flowchart of one embodiment of a method 500 for pairing sensors with components of a powered system, such as a vehicle system. The method 500 may be used to determine where sensors are located and/or where the characteristics monitored by the different sensors are located so that additional data provided by the sensors can be associated with the correct components. At 502, components of the powered system are commanded to change operations in different ways. With respect to a vehicle system, different traction motors may be directed to apply an additional amount of torque at different designated frequencies. At 504, data sensed by different sensors are examined. For example, the vibrations detected by the sensors may be transformed from the time domain to the frequency domain, and the vibrations may be examined to determine where the frequencies where the vibrations are more prevalent.

At 506, a determination is made as to whether the data from a sensor represents the changed operation of a component. For example, the data from a sensor may be examined to determine if the data includes increased vibrations at any of the frequencies at which the additional torque was applied to the different motors. If the data represents increased vibrations at a frequency where additional torque was applied for a motor, then the sensor may be located on or near that motor. As a result, flow of the method 500 can proceed toward 508. If the data does not represent increased vibrations at a frequency where additional torque was applied for a motor, then the sensor may not be located on or near that motor. As a result, flow of the method 500 can return toward 504. The data from one or more other sensors can then be compared to the frequencies at which the torque was added for different motors.

At 508, the sensor is associated with the motor. For example, the sensor providing data having increased vibrations at the frequency where the motor increased torque is paired with that motor. The sensor is paired with the motor so that additional data provided by the sensor is known to represent operations of that motor.

In one embodiment, a method includes sensing one or more characteristics of vehicles in a vehicle system with sensors disposed onboard the vehicles and communicating data representative of the one or more characteristics from the sensors to one or more of a controller or a control system of the vehicle system. The data communicated from the sensors onboard the same vehicle can be synchronously communicated with respect to the sensors onboard the same vehicle and asynchronously communicated with respect to the sensors disposed onboard one or more other vehicles in the vehicle system.

Optionally, the data is synchronously communicated by the sensors disposed onboard the same vehicle wirelessly communicating the data at one or more of the same time or during the same time period.

Optionally, the data is synchronously communicated from the sensors at the same time or times.

Optionally, the data is asynchronously communicated by the sensors disposed onboard the same vehicle wirelessly communicating the data at one or more of the same time or during the same time period that differs from one or more of a time or time period that the sensors disposed onboard the one or more other vehicles communicate the data.

Optionally, the data that is communicated represents one or more of temperatures of the vehicles or environment, movement in one or more directions, pressure, a fluid level, geographic or other locations, speed, sounds, images, or videos.

Optionally, the method also can include changing operations of different components of one or more of the vehicles and pairing the sensors with the different components of the one or more of the vehicles based on whether the data that is communicated from the sensors represents the operations that are changed.

Optionally, changing operations of the different components includes directing traction motors disposed onboard the same vehicle to generate additional torques at different designated frequencies. The frequency at which the additional torque is generated can differ for each of the different traction motors.

Optionally, pairing the sensors includes determining whether the data provided by one or more of the sensors represents the additional torque at the frequency designated for a first motor of the traction motors, and associating the sensor with the first motor.

In one embodiment, a system includes sensors configured to be disposed onboard vehicles in a vehicle system and to sense one or more characteristics of the vehicles and one or more of a controller or a control system configured to receive data representative of the one or more characteristics from the sensors. The data communicated from the sensors onboard the same vehicle is synchronously communicated with respect to the sensors onboard the same vehicle and asynchronously communicated with respect to the sensors disposed onboard one or more other vehicles in the vehicle system.

Optionally, the sensors are configured to synchronously communicate the data by the sensors disposed onboard the same vehicle wirelessly communicating the data at one or more of the same time or during the same time period.

Optionally, the sensors are configured to synchronously send the data to the one or more of the controller or the control system at the same times.

Optionally, the sensors are configured to asynchronously communicate the data by the sensors disposed onboard the same vehicle wirelessly communicating the data at one or more of the same time or during the same time period that differs from one or more of a time or time period that the sensors disposed onboard the one or more other vehicles communicate the data.

Optionally, the data that is communicated represents one or more of temperatures of the vehicles or environment, movement in one or more directions, pressure, a fluid level, geographic or other locations, speed, sounds, images, or videos.

Optionally, the sensors include one or more of a temperature sensor, a vibration sensor, a pressure sensor, a fluid sensor, a location sensor, a speed sensor, an acoustic sensor, an optic sensor, or an electromagnetic sensor.

Optionally, one or more of the controller or the control system is configured to change operations of different components of one or more of the vehicles. The one or more of the controller or the control system is configured to pair the sensors with the different components of the one or more of the vehicles based on whether the data that is communicated from the sensors represents the operations that are changed.

Optionally, one or more of the controller or the control system is configured to change the operations of the different components by directing traction motors disposed onboard the same vehicle to generate additional torque at different designated frequencies. The frequency at which the additional torque is generated can differ for each of the different traction motors.

Optionally, the one or more of the controller or the control system is configured to pair the sensors by determining whether the data provided by one or more of the sensors represents the additional torque at the frequency designated for a first motor of the traction motors and associating the sensor with the first motor.

In one embodiment, a method directing components disposed onboard a vehicle system to change operations, monitoring data output by sensors operatively connected with the components, and determining which of the sensors are operatively connected with which of the components based on the operations of the components that are changed and the data that is output by the sensors.

Optionally, directing the components to change the operations includes directing traction motors disposed onboard the vehicle system to generate additional torque at different designated frequencies.

Optionally, determining which of the sensors are operatively connected with which of the components includes determining which of the sensors provide the data representing the additional torque at the designated frequencies of the traction motors, and pairing the sensors with the traction motors based on the data and the designated frequencies.

Optionally, the method also includes directing the sensors disposed onboard a first vehicle of the vehicle system to synchronously communicate the data with the sensors onboard the first vehicle and to asynchronously communicate the data relative to the sensors onboard one or more other vehicles of the vehicle system.

In one embodiment, a system includes a control system configured to direct components disposed onboard a vehicle system to change operations, the control system also configured to monitor data output by sensors operatively connected with the components. The control system is configured to determine which of the sensors are operatively connected with which of the components based on the operations of the components that are changed and the data that is output by the sensors.

Optionally, the control system is configured to direct the components to change the operations by directing traction motors disposed onboard the vehicle system to generate additional torque at different designated frequencies.

Optionally, the control system is configured to determine which of the sensors are operatively connected with which of the components includes determining which of the sensors provide the data representing the additional torque at the designated frequencies of the traction motors, and the control system is configured to pair the sensors with the traction motors based on the data and the designated frequencies.

Optionally, the control system is configured to direct the sensors disposed onboard a first vehicle of the vehicle system to synchronously communicate the data with the sensors onboard the first vehicle and to asynchronously communicate the data relative to the sensors onboard one or more other vehicles of the vehicle system.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to those of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter and also to enable any person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general-purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods for communicating data in a vehicle consist, without departing from the spirit and scope of the inventive subject matter herein involved, it is intended that all of the subject matter of the above description or shown in the accompanying drawings shall be interpreted merely as examples illustrating the inventive concept herein and shall not be construed as limiting the inventive subject matter.

What is claimed is:
1. A system comprising:
 sensors configured to be disposed onboard locomotives in a rail vehicle system and to sense one or more characteristics of the locomotives; and
 one or more of a controller or a control system configured to receive data representative of the one or more characteristics from the sensors,
 wherein the sensors are configured to synchronously communicate the data from the sensors disposed onboard the same locomotive with respect to the sensors disposed onboard the same locomotive, and wherein the sensors are configured to asynchronously communicate the data from the sensors disposed onboard different locomotives of the locomotives in the rail vehicle system.

2. The system of claim 1, wherein the sensors are configured to synchronously communicate the data by the sensors disposed onboard the same locomotive by wirelessly communicating the data at one or more of a common time or during a common time period.

3. The system of claim 1, wherein the sensors are configured to asynchronously communicate the data by the sensors disposed onboard the different locomotives communicating the data at one or more of a different time or during a different time period than the sensors that synchronously communicate the data.

4. The system of claim 1, wherein the data that is communicated represents one or more of temperatures of the locomotives or environment, movement in one or more directions, pressure, a fluid level, geographic or other locations, speed, sounds, images, or videos.

5. The system of claim 1, wherein the sensors include one or more of a temperature sensor, a vibration sensor, a pressure sensor, a fluid sensor, a location sensor, a speed sensor, an acoustic sensor, an optic sensor, or an electromagnetic sensor.

6. The system of claim 1, wherein the one or more of the controller or the control system is configured to change operations of different components of one or more of the locomotives, and the one or more of the controller or the control system is configured to logically pair the sensors with the different components of the one or more of the locomotives based on whether the data that is communicated from the sensors represents the operations that are changed.

7. The system of claim 6, wherein the one or more of the controller or the control system is configured to change the operations of the different components by directing traction motors disposed onboard the same locomotive to generate additional torque at different designated frequencies, wherein the frequency at which the additional torque is generated differs for each of the different traction motors.

8. The system of claim 7, wherein the one or more of the controller or the control system is configured to logically pair the sensors by determining whether the data provided by one or more of the sensors represents the additional torque at the frequency designated for a first motor of the traction motors, and associating the sensor with the first motor.

9. A method comprising:
sensing one or more characteristics of locomotives in a rail vehicle system with sensors disposed onboard the locomotives;
synchronously communicating data representative of the one or more characteristics from the sensors to one or more of a controller or a control system of the rail vehicle system, the data synchronously communicated by two or more of the sensors disposed onboard a common locomotive of the locomotives in the rail vehicle system; and
asynchronously communicating the data representative of the one or more characteristics from the sensors to the one or more of the controller or the control system of the rail vehicle system, the data asynchronously communicated by two or more of the sensors disposed onboard different locomotives of the rail vehicle system.

10. The method of claim 9, wherein the data is synchronously communicated by the sensors disposed onboard the same locomotive wirelessly communicating the data at one or more of a common time or during a common time period.

11. The method of claim 9, wherein the data is asynchronously communicated by the sensors disposed onboard a first locomotive communicating the data at one or more of a different time or during a different time period than the sensors disposed onboard a second locomotive.

12. The method of claim 9, wherein the data that is communicated represents one or more of temperatures of the locomotives or environment, movement in one or more directions, pressure, a fluid level, geographic or other locations, speed, sounds, images, or videos.

13. The method of claim 9, further comprising:
changing operations of different components of one or more of the locomotives; and
pairing the sensors with the different components of the one or more of the locomotives based on whether the data that is communicated from the sensors represents the operations that are changed.

14. The method of claim 13, wherein changing the operations of the different components includes directing traction motors disposed onboard the same locomotive to generate additional torques at different designated frequencies, wherein the frequency at which the additional torque is generated differs for each of the different traction motors.

15. The method of claim 14, wherein pairing the sensors includes determining whether the data provided by one or more of the sensors represents the additional torque at the frequency designated for a first motor of the traction motors, and associating the sensor with the first motor.

16. A system comprising:
sensors disposed onboard locomotives of a rail vehicle system, the sensors configured to measure operations of the rail vehicle system and to output data representative of the operations that are measured, wherein the sensors disposed onboard a common locomotive of the locomotives are configured to synchronously communicate the data during a common time period that differs from a different time period during which the sensors disposed onboard a different locomotive of the locomotives communicate the data; and
a control system configured to direct components disposed onboard the rail vehicle system to change the operations and to monitor the data that is output by the sensors,
wherein the control system is configured to determine which of the sensors are operatively connected with which of the components based on the operations of the components that are changed and the data that is output by the sensors.

17. The system of claim 16, wherein the sensors disposed onboard different locomotives of the rail vehicle system asynchronously communicate the data during different time periods.

18. The system of claim 16, wherein the control system is configured to direct the components to change the operations by directing traction motors disposed onboard the rail vehicle system to generate additional torque at different designated frequencies.

19. The system of claim 18, wherein the control system is configured to determine which of the sensors are operatively connected with which of the components includes determining which of the sensors provide the data representing the additional torque at the designated frequencies of the traction motors, and the control system is configured to logically pair the sensors with the traction motors based on the data and the designated frequencies.

20. The system of claim 16, wherein the control system is configured to direct the sensors disposed onboard a first locomotive of the rail vehicle system to synchronously communicate the data with the sensors onboard the first locomotive and to asynchronously communicate the data relative to the sensors onboard one or more other locomotives of the rail vehicle system.

\* \* \* \* \*